United States Patent
Mutou et al.

[11] Patent Number: 6,074,099
[45] Date of Patent: Jun. 13, 2000

[54] CAGE FOR BALL BEARING

[75] Inventors: Yasushi Mutou; Kazuhiro Fujiu; Toshio Matsushima; Takashi Ogawa; Banda Noda, all of Fujisawa, Japan

[73] Assignee: NSK Ltd., Tokyo, Japan

[21] Appl. No.: 09/135,665

[22] Filed: Aug. 18, 1998

[30] Foreign Application Priority Data

Aug. 18, 1997 [JP] Japan .................................. 9-221342
Jul. 21, 1998 [JP] Japan ................................. 10-204554

[51] Int. Cl.[7] ................................................. F16C 33/38
[52] U.S. Cl. .......................... 384/533; 384/470; 384/523; 384/530; 384/531
[58] Field of Search ..................................... 384/523, 526, 384/527, 528, 531, 532, 533, 534, 470

[56] References Cited

U.S. PATENT DOCUMENTS

| | | | |
|---|---|---|---|
| 3,918,777 | 11/1975 | Kitchin | 384/528 |
| 4,136,915 | 1/1979 | Derner | 384/526 |
| 4,225,199 | 9/1980 | Earsley | 384/470 |
| 4,493,513 | 1/1985 | Osawa et al. | 384/533 |
| 4,572,678 | 2/1986 | Neder et al. | 384/533 |
| 5,044,783 | 9/1991 | Willner | 384/523 |
| 5,806,990 | 9/1998 | Ueno et al. | 384/530 |

FOREIGN PATENT DOCUMENTS

| | | |
|---|---|---|
| 9-273557 | 10/1997 | Japan . |
| 9-317775 | 12/1997 | Japan . |
| 10-19046 | 1/1998 | Japan . |
| 2 306 582 | 5/1997 | United Kingdom . |

*Primary Examiner*—Thomas R. Hannon
*Attorney, Agent, or Firm*—Helfgott & Karas, P.C.

[57] ABSTRACT

A cage for ball bearing having pockets 7 the inner surface of which comprises a spherical surface portion 15 and a pair of cylindrical surface portions 16 on the opposite sides of the spherical surface portion 15 connected continuously to the opposite edges of the spherical surface portion 15, the spherical surface portion 15 having a radius of curvature slightly larger than the radius of curvature of the rolling contact surface of the balls to be held in the pockets 7, wherein the area of the spherical surface portion 15 in sliding contact with the rolling surface of the balls is decreased to smoothly supply the pockets 7 with lubricant to decrease the cage sound caused due to friction.

6 Claims, 12 Drawing Sheets

CAGE FOR BALL BEARING

BACKGROUND OF THE INVENTION

The present invention relates to a cage for the ball bearing which is incorporated for use in a rotational support section of various rotatable machines where low noise, low vibration and low torque are required, specifically in a fan motor for machine tools, general machines and automobiles or in an air conditioner motor, or in a cooling fan motor for various machines and apparatus.

For example, a ball bearing as shown in FIG. 13 is widely used for supporting various rotational portions such as bearings in various rotational machines. This ball bearing comprises an inner ring 2 having an inner ring raceway 1 on its outer peripheral surface and an outer ring 4 having an outer ring raceway 3 on its inner peripheral surface, which are concentric with each other, and a plurality of balls 5 rotatably provided between the inner ring raceway 1 and the outer ring raceway 3, specifically in pockets 7 of a cage 6, respectively.

In the example illustrated, the inner ring raceway 1 and the outer ring raceway 3 are formed in a deep groove type.

The cage 6 of the ball bearing in FIG. 13 is referred to as "corrugated cage" and comprised of a pair of elements 8 which are formed in an annular corrugation by pressing a metal plate member, respectively.

The elements 8 are formed with substantially semicylindrical recess portions 9 to circumferentially define the pockets 7.

The pair of elements 8 are abutted with each other at portions separated from the recess portions 9, and these portions are securely connected with each other by rivets 10, thereby forming the annular cage 6 having pockets 7 arranged in a circumferential direction.

The middle portion on the inner surface of the recess portions 9 is formed in a spherical concave surface in an arcuate cross section having a radius of curvature slightly larger than the radius of curvature of the outer surface of the balls 5. Accordingly, when the pair of elements 8 are abutted to each other, the recess portions 9 are combined to form the pockets 7, respectively.

The cage 11 illustrated in FIG. 14 is referred to as "crown type cage", and comprised of an annular main portion 12 made of synthetic resin etc. where a plurality of resilient pieces 13 are formed on the main portion 12 with a space therebetween, and pockets 7 each including a spherical concave face portion 14 are arranged circumferentially to rotatably support balls 5 (FIG. 13), respectively.

In the cage 11 of the crown type, the pockets 7 are defined by the opposite side faces of a pair of the resilient pieces 13 and the spherical concave ace portion 14 between the opposite side faces, respectively. It will be noted that the resilient pieces 13 and the spherical concave face portions 14 are formed on one axial side face (right face in FIG. 14) of the main portion 12. The term "axial" means substantially left and right directions in FIG. 14.

The radius of curvature of the opposite side faces and concave face portion 14 between the opposite side faces is slightly larger than the radius of curvature of the outer surface of the balls 5.

When assembling the ball bearing, the balls 5 are forcedly inserted, respectively, between the pair of the resilient pieces 13 for the pockets 7 expanding the space between the tip end edges of the pair of the resilient pieces 13. Thus, the balls 5 are nested in the pockets 7 of the cage 11, respectively, and held rotatably between the inner ring raceway 1 and the outer ring raceway 3 (FIG. 13).

During use of the ball bearing with the cage 6 or 11, as the balls 5 rotate, the inner ring 2 and the outer ring 4 are rotated relative to each other. The balls 5 spin around the inner ring 2 while rotating The cage 6 or 11 rotates around the inner ring 2 at the same speed to the spinning speed of the balls 5.

Grease or another lubricant oil is filled in or continuously supplied between the outer peripheral surface of the inner ring 2 and the inner peripheral surface of the outer ring 4 for smooth relative rotation therebetween. Thus vibration and noise, and failure such as seizure are prevented from occurring in the ball bearing.

In some ball bearings, the opposite openings of the space between the outer peripheral surface of the inner ring 2 and the inner peripheral surface of the outer ring 4 are closed with a seal member such as seal plate or shield plate, so that lubricant is prevented from leaking out of the space and any foreign matter such as dust is prevented from entering the space. The ball bearing shown in FIG. 13 has no seal member.

In the case of the ball bearing with the cage 6 or 11, even if the necessary amount of lubricant is filled or supplied, vibrations are caused in the cage 6 or 11, and the noise and vibration, referred to as "cage sound" are sometimes produced in the ball bearing with the cage 6 or 11 incorporated therein.

Such vibration in the cage 6 or 11 is caused due to sliding friction between the balls 5 and the cage 6 or 11 because of large movement amount of the cage 6 or 11 with respect to the balls 5. In order to suppress the cage sound, conventionally, the clearance between the inner surface of the pockets 7 and the rolling contact surface of the balls 5 is minimized, and the movement of the cage 6 or 11 with respect to the balls 5 is minimized to suppress the cage sound.

However, even if the movement amount of the cage 6 or 11 with respect to the balls 5 is minimized, when the operating condition is severe, as in the case of insufficient supply of lubricant, the cage sound may be produced due to the shape of the inner peripheral surface of the pockets 7 of the cage 6 or 11.

Specifically in the case of the conventional cages 6 or 11 as shown in FIGS. 13 and 14, the inner peripheral surface of the pockets 7 is slidable against the rolling contact surface of the balls 5 generally through the whole width, so that the frictional force operating between the inner peripheral surface and the rolling contact surface becomes large. This is detailed referring to FIGS. 15 to 18 hereinafter.

In the case of the conventional structure of FIG. 13, the recess portions 9 in the inner peripheral surface of the pockets 7 are formed with a spherical surface portion 15 throughout its width in the most part thereof, respectively, as shown in FIGS. 15 and 16 by cross hatching. This spherical surface portions 15 function as a hold and guide face having a radius of curvature slightly larger than the radius of curvature of the rolling contact surface of the balls 5 (FIGS. 13 and 16).

In the case of the conventional structure of FIG. 14, the inner peripheral surface of the pockets 7 is formed with a spherical surface portion 15 throughout its whole width, as shown in FIGS. 17 and 18 by cross hatching. This spherical surface portion 15 functions as a hold and guide face having a radius of curvature slightly larger than the radius of curvature of the rolling contact surface of the balls 5.

Due to the spherical surface portion(s) 15 for the hold and guide face formed on the inner peripheral surface of the pockets 7 throughout its width, the friction area between the inner peripheral surface of the pockets 7 and the rolling contact surface of the balls 5 is enlarged, so that the friction vibration produced in the friction contact portion between the cage 6 or 11 and the balls 5 is so large to induce vibration and noise.

In these cases, if the spherical surface portion 15 in the pockets 7 is formed in a single spherical surface throughout its whole width, and if the center $O_{15}$ (FIG. 20) of the spherical surface portion 15 of the pockets 7 is displaced from the center $O_5$ (FIGS. 20 and 21) of the balls 5 in the pockets 7, the lubricant adhering to the rolling contact surface of the balls 5 is scraped off, resulting in large vibration and noise.

This is detailed referring to FIGS. 19 to 21 for the case of the corrugated cage as shown in FIG. 13.

In the conventional cage 6, the radius of curvature $R_{15}$ of the spherical surface portions 15 of the pockets 7 formed in a single surface, as shown in FIG. 19, is slightly larger than the radius of curvature $R_5$ of the balls 5 ($R_{15} > R_5$) In addition, the depth $D_7$, of the pockets 7, which is a half of the inner size of the pockets 7 with respect to the width direction of the cage 6, is slightly smaller than the radius of curvature $R_{15}$ of the spherical surface portions 15 as shown in FIG. 20 (exaggerated).

During operation of the ball bearing having such a cage 6 incorporated therein, the rolling contact surface of the balls 5 and the inner surface of the pockets 7 of the cage 6 come into contact with each other, and the balls 5, while rotating, spin around the inner ring 2 at the same speed to the rotation speed of the cage 6.

It should be noted that due to the profile errors in the inner ring raceway 1 and the outer ring raceway 3 (FIG. 13), the relative differences in the balls 5 and/or the inclination of the ball bearing (displacement between the center axis of the inner ring 2 and the center axis of the outer ring) etc., the balls are not completely harmonized with each other in spinning speed, so that slight delay or advance of the balls relative to each other is caused.

As a result, with respect to the balls 5 and the cage 6, the balls 5 sometimes push the cage 6 in the direction of spinning around the inner ring 2 and the cage 6 sometimes pushes the balls 5. In each case, the rolling contact surface of the balls 5 comes in contact with the spherical surface portions 15 of the inner surface of the pockets 7. Specifically, the radius of curvature $R_{15}$ of the spherical surface portions 15 is larger than the radius of curvature $R_5$ of the balls 5, the cage 6 is radially displaced by a distance equal to the clearance based on the differences between the radius of the curvature $R_{15}$ and the radius of curvature $R_5$ as shown in FIG. 21. In this condition, the rolling contact surface of the balls 5 comes into sliding contact with the spherical surface portions 15 of the pockets 7.

Specifically in this condition, as shown in FIGS. 20 and 21, the spherical surface portions 15 of the pockets 7 and the rolling contact surface of the balls 5 come into sliding contact with each other on either side in the width direction (up and down directions in FIG. 20, left and right directions in FIG. 21) of the cage 6, specifically at two points $P_1$ and $P_2$ which are separated from the circumferentially central portion of the pockets 7 toward a circumferential end.

When the center $O_7$ of the pockets 7 of the cage 6 is displaced radially inward from the center $O_5$ of the balls 5 as shown in FIG. 21 due to the clearance based on the difference between the radius of curvature $R_{15}$ and the radius of curvature $R_5$, a portion in the rolling contact surface of the balls 5 closer to the radially outer periphery of the cage 6 comes into sliding contact with a portion of the spherical surface portions 15 of the pockets 7 closer to the radially outer periphery of the cage 6. The lubricant such as grease and oil adhering to the rolling contact surface of the balls 5 for lubrication of the ball bearing is scraped off by the spherical surface portions 15, so that this lubricant would not enter the pockets 7 and be pushed out of the pockets 7.

On the other side in the circumferential direction of the cage 6, a portion of the rolling contact surface of the balls 5 closer to the radially inner periphery of the cage 6 comes into sliding contact with a portion of the spherical surface portions 15 of the pockets 7 closer to the radially inner periphery of the cage 6, which would also cause shortage in feeding of the lubricant.

As a result, the sliding friction coefficiency at the sliding contact portions between the spherical surface portions 15 of the pockets 7 in the cage 6 and the rolling contact surface of the balls 5 increases, and the friction torque of the ball bearing with the cage 6 incorporated therein varies or increases, and the friction sound of the balls occurs in operation, sometimes outstandingly.

SUMMARY OF THE INVENTION

An object of the present invention is to provide a cage for the ball bearing solving the problems as mentioned above.

Another object of the present invention is to provide a cage for the ball bearing wherein lubricant is efficiently supplied to the clearances between the cage and the balls in the cage.

DETAILED DESCRIPTION OF THE PREFERRED EMBODIMENTS

Figure 1:
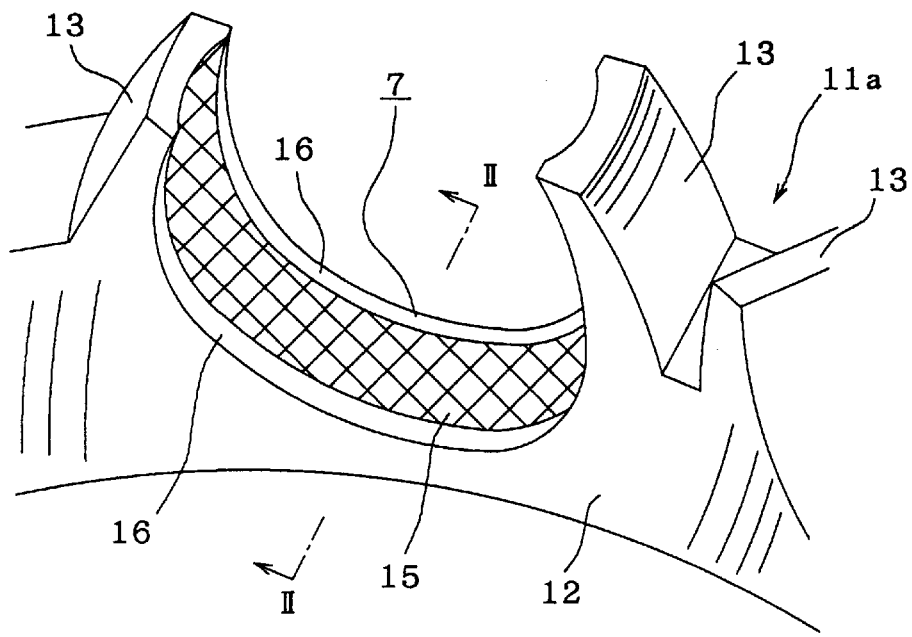
FIG. 1 is an enlarged perspective view of part of the part according to a first example of the embodiments in the present invention.

The cage for the ball bearing of the present invention is formed generally in an annular or cylindrical shape and has a plurality of pockets circumferentially internittently formed, which is similar to the conventional cage for the ball bearing.

In one feature, the pockets have an inner surface comprising a spherical surface portion and a cylindrical surface portion provided adjacent the spherical surface portion on at least one opening side of the pockets.

The spherical surface portion is formed circumferentially generally throughout the length of the inner surface of the pockets and recessed with a radius of curvature slightly larger than the radius of curvature of the rolling contact surface of the balls rotatably held in the pockets, respectively.

The cylindrical surface portion is formed circumferentially generally throughout the length of the inner surface of the pockets between the edge of the spherical surface portion and the opening edge of the respective pockets.

It is desirable that the edge of the spherical surface portion is smoothly connected to the cylindrical surface portion with a curved surface portion having a cross section in an arc shape.

In another feature, the pockets have an inner surface comprising a spherical surface portion and a curved surface portion provided adjacent the spherical portion on at least one opening side of the pockets.

The spherical surface portion is formed circumferentially generally throughout the length of the inner surface of the pockets and recessed with a radius of curvature slightly larger than the radius of curvature of the rolling contact surface of the balls rotatably held in the respective pockets.

The curved surface portion is formed between the edge of the spherical surface portion and the opening edge of the respective pockets to be a smooth continuation from the edge of the spherical surface portion to the opening of the respective pockets. The curved surface portion has a radius of curvature slightly larger than the spherical surface portion, but can be flared away from the rolling contact surface of the balls in the pockets.

In the cages for the ball bearing as constructed above in the present invention, the rolling contact surface of the respective balls comes into sliding contact with the inner peripheral surface of the respective pockets only at the spherical surface portion, but not at the cylindrical surface portion(s) and not at the curved surface portion(s).

There is a clearance between the rolling contact surface of the ball in the respective pockets and the cylindrical surface portion(s) and the curved surface portion(s), which is larger than the clearance between the spherical surface portion and the rolling contact surface.

Accordingly, not only the friction area between the inner peripheral surface of the pockets and the rolling contact surface of the balls decreases, but also the lubricant is smoothly supplied to the clearance between the spherical surface portion and the rolling contact surface.

Since the cylindrical surface portion(s) and the curved surface portion(s) extend generally throughout the respective pockets, the lubricant is effectively supplied to the clearance between the spherical surface portion and the rolling contact surface.

Consequently, the friction and therefore friction vibration occurring in the sliding contact portion between the cage and the respective balls are decreased, so that the vibration and noise are decreased in the ball bearing.

In the case where the edge of the spherical surface portion is smoothly connected to the cylindrical surface portion(s) with a curved surface portion having a cross section in an arc shape, the lubricant is not scraped off at this connecting portion, so that the lubricant is more effectively supplied to the clearance between the spherical surface portion and the rolling contact surface.

Now, the present invention is further explained referring to the attached drawings.

Figure 2:
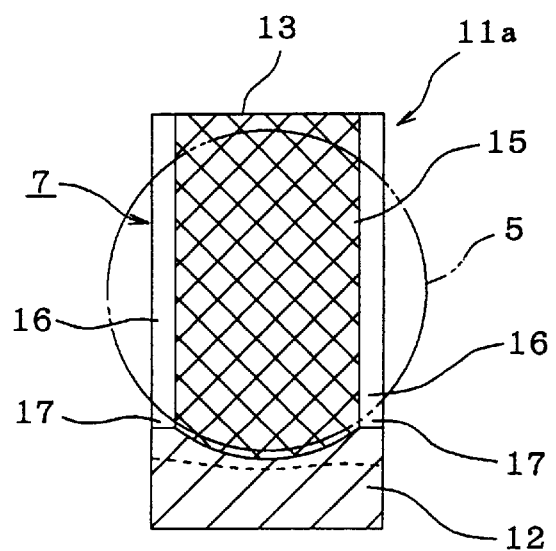
FIG. 2 is a cross sectional view taken along the line II—II in FIG. 1.
Figure 12:
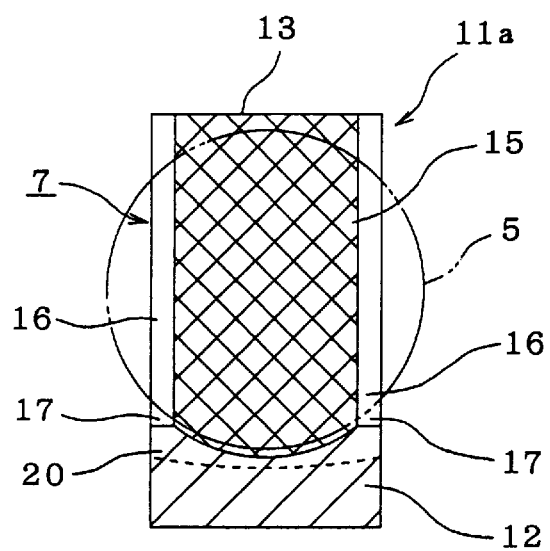
FIG. 12 is a cross sectional view taken along the line XII—XII in FIG. 11.

FIGS. 1 and 2 show a first example of the embodiments of the present invention, specifically applied to a crown type cage made of synthetic resin as shown in FIG. 12.

The features of the present invention reside in that the inner surface shape of the respective pockets is tailored to decrease the friction area between the inner peripheral surface of the pockets 7 and the rolling contact surface of the balls 5 and to effectively supply the lubricant such as grease and lubricant oil to between the inner peripheral surface and the rolling contact surface. In the other portions, the construction and operation are substantially the same to those of the conventional ones and therefore omitted or simplified for the corresponding portions. The following explanation is focused on the features of the present invention.

In part of the inner surface of the pockets, specifically in the central portion illustrated by the cross hatching in FIGS. 1 and 2, the spherical surface portion 15 functioning as a hold and guide surface is provided generally along the entire length of the pockets 7. The spherical surface portion 15 is recessed to have a single center and its radius of curvature is slightly larger than the radius of curvature of the rolling contact surface of the balls 5 rotatably held in the pockets 7.

Provided on the opposite side portions of the respective pockets 7, specifically closer to the radially outer and inner peripheries of the cage 11a, are the cylindrical surface portions 16 which are located in a single cylindrical shape, and have their center axis located in the diameter direction of the cage 11a (the central axis of the arc defined by the pockets 7).

Accordingly, when the cage 11a of this example is incorporated in a ball bearing, the rolling contact surface of the balls 5 may come into sliding contact with the spherical surface portion 15, but not with the cylindrical surface portions 16.

In addition, wedge shaped clearances 17 are formed between the cylindrical surface portions 16 and the rolling contact surface of the balls 5, specifically on the opposite opening portions, such that the clearances 17 extend generally along the whole length of the opening portions and that the width of the clearances 17 become larger toward the opposite opening portions.

Since in this cage for the ball bearing, the rolling contact surface of the balls 5 comes into sliding contact with the inner peripheral surface of the pockets 7 only at the spherical surface portion 15, but not at the cylindrical surface portions 16, the friction area between the rolling contact surface of the balls 5 and the inner peripheral surface of the pockets 7 decreases and the friction vibration caused at the sliding contact portions between the cage 11a and the balls 5 decreases, and therefore vibration and noise decrease in the ball bearing.

Since the wedge shaped clearances 17 exist between the rolling contact surface of the balls 5 and the pair of cylindrical surface portions 16 on the opposite side of the spherical surface portion 15, the lubricant adhering to the rolling contact surface of the balls 5 is smoothly fed from the wedge shaped clearances 17 to the clearances between the spherical surface portion 15 and the rolling contact surface during operation of the ball bearing having the cage 11a incorporated therein.

Since the cylindrical surface portions 16 are provided on the opposite opening portions of the pockets 7 generally along the whole length thereof, and the wedge shaped spaces 17 extend generally along the whole length of the opening portions, the lubricant can be effectively supplied to the clearances between the spherical surface portion 15 of the pockets 7 and the rolling contact surface of the balls 5.

Consequently, the friction occurring in the sliding contact portions between the cage 11a and the balls 5 decreases, and the friction vibration occurring at the sliding contact portions decreases, whereby the vibration and noise decrease in the ball bearing.

Figure 3:
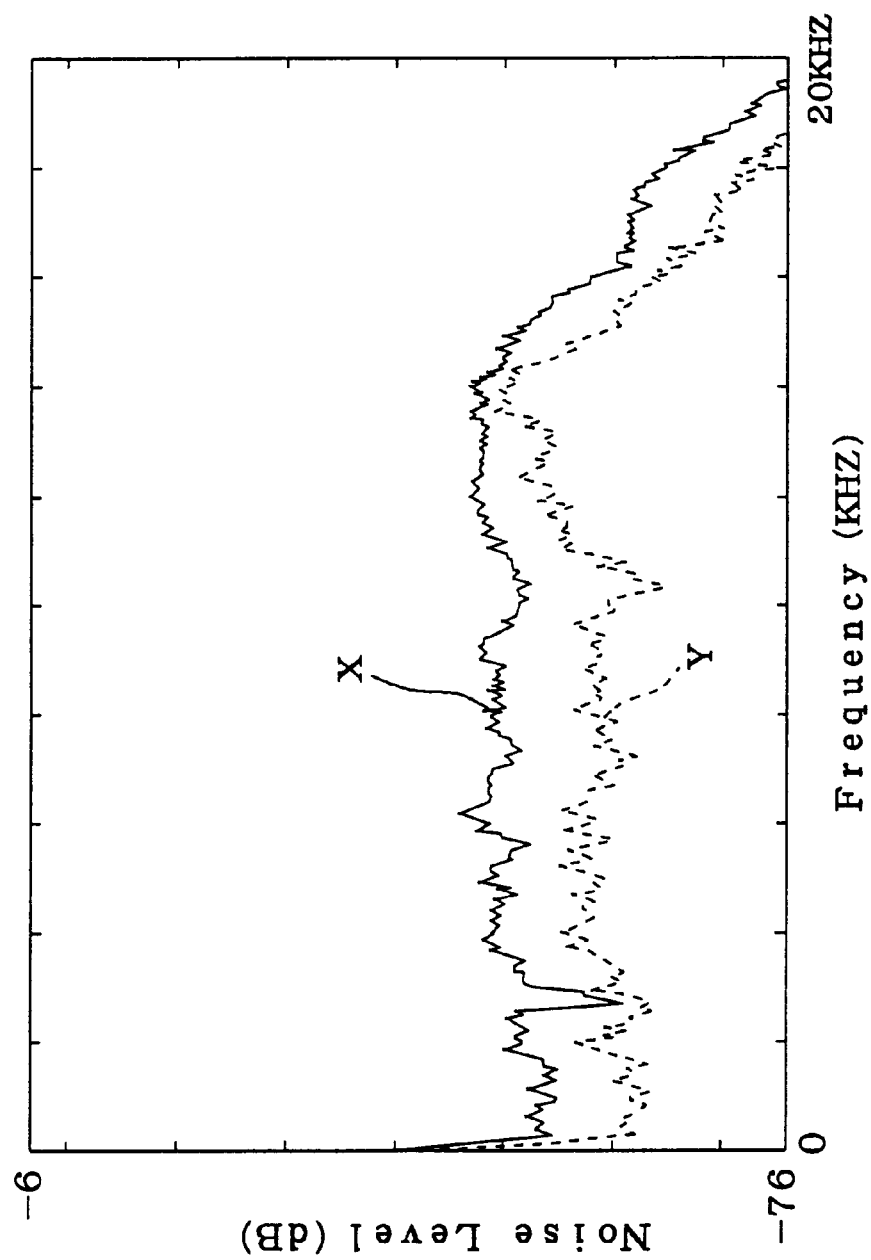
FIG. 3 is a graph showing the frequency spectrum o the noise measured in a ball bearing having the cage of the first example of the present invention installed therein (Y) and the ball bearing having a conventional cage installed therein (X).

FIG. 3 shows a result of the experiments which the inventor of this application conducted to confirm the results of the cage 11a of the present invention, specifically a frequency spectrum of sounds produced in the ball bearing having the cage 11a incorporated therein, where the abscissa represents the frequency and the ordinate represents the noise level.

The measurements results are shown by the solid curve line X and the dotted line Y, where the solid line X represents the frequency spectrum of the noise produced from the ball bearing using a cage having the spherical surface portion 15 formed across the whole width of the inner peripheral surface of the pockets 7 while the dotted line Y represents the frequency spectrum of the noise produced from the ball bearing using the cage 11a having the spherical surface portion 15 with a smaller width size. Incidentally, the same (corresponding) components except for the cages are used in the ball bearings for the measurement.

As clear from the curve lines X and Y in FIG. 3, the noisy high frequency components decrease in the ball bearing using the cage 11a of the present invention to improve the acoustic property.

Figure 4:
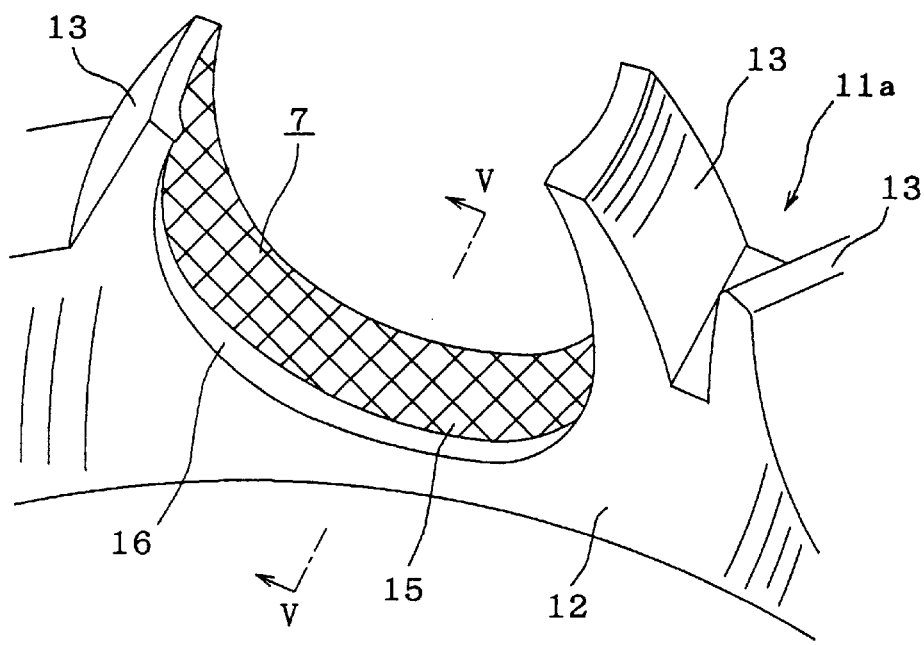
FIG. 4 is an enlarged perspective view of part of the cage according to a second example of the embodiments in the present invention
Figure 5:
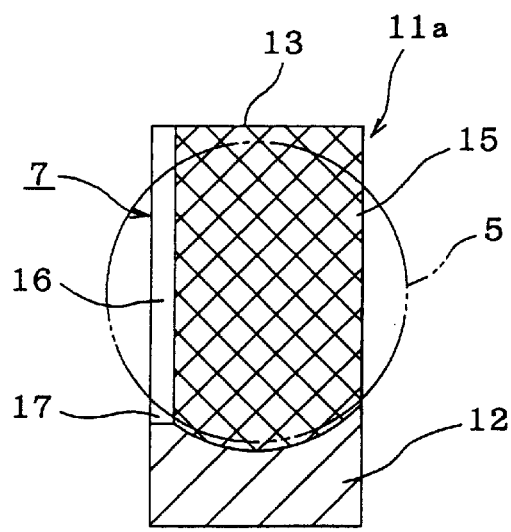
FIG. 5 is a cross sectional view taken along the line V—V in FIG. 4.

FIGS. 4 and 5 show a second example of the embodiments of the present invention, where the spherical surface portion 15 on the inner peripheral surface of the pockets 7 is displaced toward the radially outer side of the cage 11a. In this case, the spherical surface portion 15 can have a larger width size than in the case of the first example, so that the movement of the cage 11a with reference to the balls 5 is smaller than in the case of the first example, whereby the cage sound is further decreased. The other constructions and functions are substantially the same to those of the first example.

Figure 6:
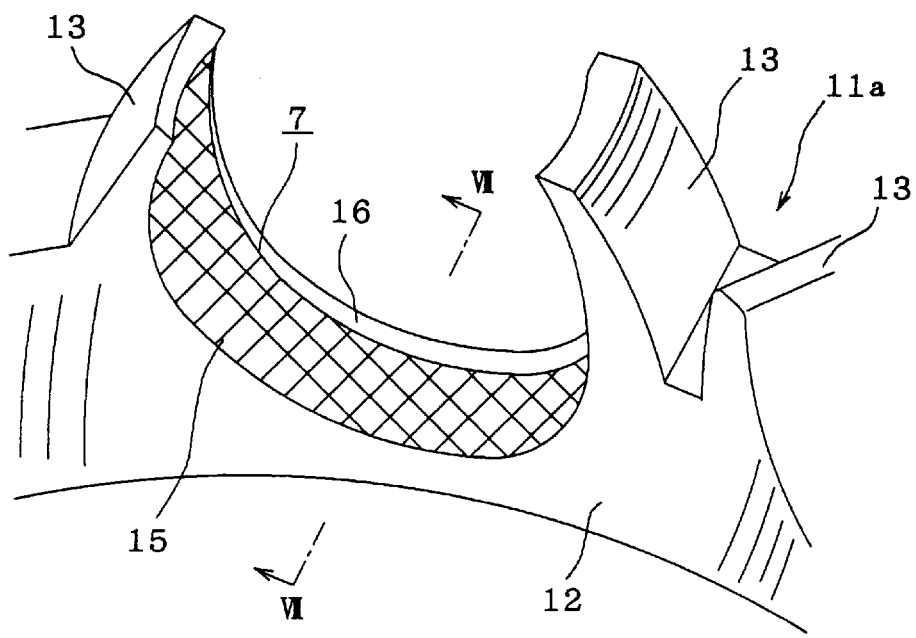
FIG. 6 is an enlarged perspective view of part of the cage according to a third example of the embodiments in the present invention.
Figure 7:
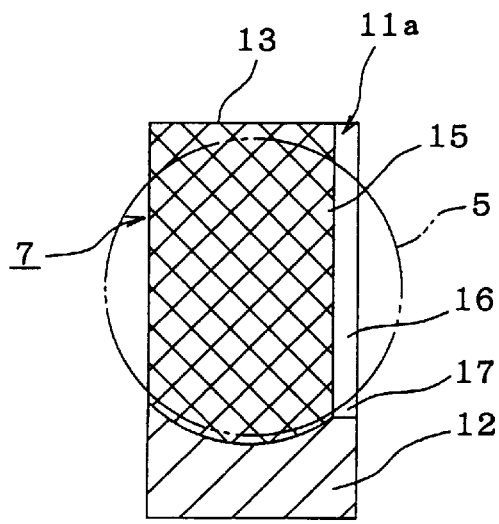
FIG. 7 is a cross sectional view taken along the line VII—VII in FIG. 6.

FIGS. 6 and 7 show a third example of the embodiments of the present invention, where the spherical surface portion 15 on the inner peripheral surface of the pockets 7 is displaced toward the radially inner side of the cage 11a. In this case, the spherical surface portion 15 can have a larger width size than in the case of the first example, so that the movement of the cage 11a with reference to the balls 5 is smaller than in the case of the first example, whereby the cage sound is further decreased which is similar to the second example. The other constructions and functions are substantially the same to those of the first example.

Figure 13:
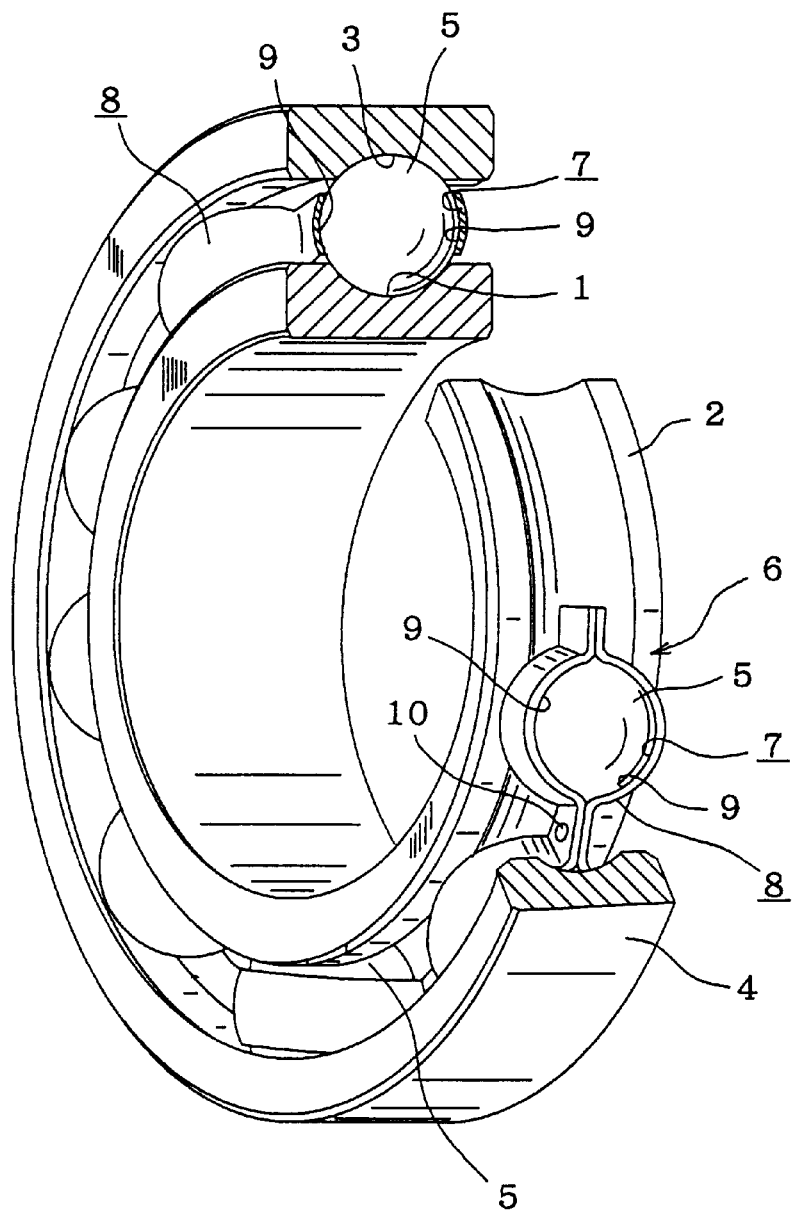
FIG. 13 is a partly cut away perspective view of a ball bearing having a cage of the present invention incorporated therein.

It should be noted that the first to third examples can be applied not only to the crown type cage made of synthetic resin but also to the corrugated type cage made of metal as shown in FIG. 13.

Figure 8:
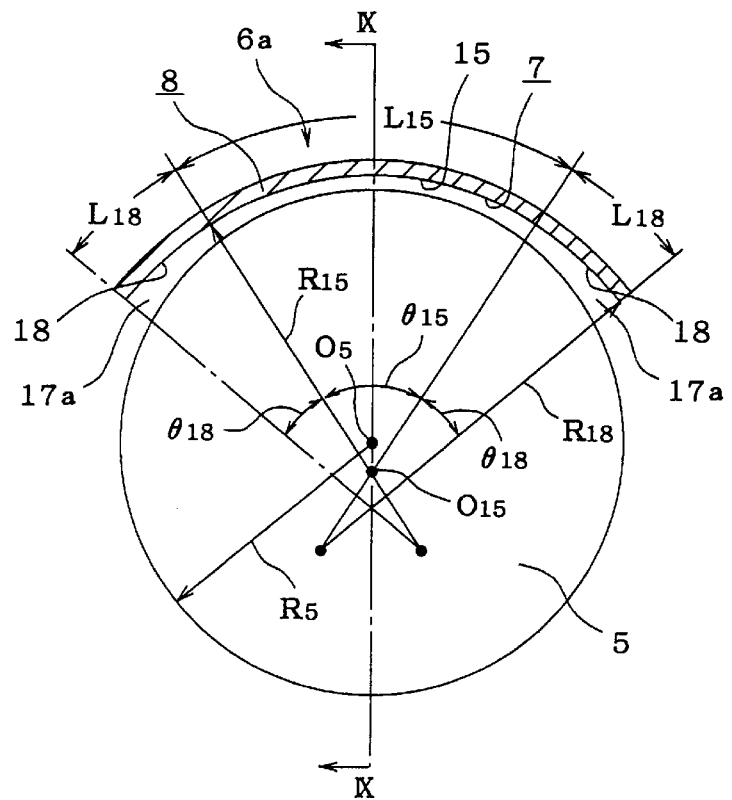
FIG. 8 is an enlarged cross sectional view of part of the cage according to a fourth example of the embodiments in the present invention.
Figure 9:
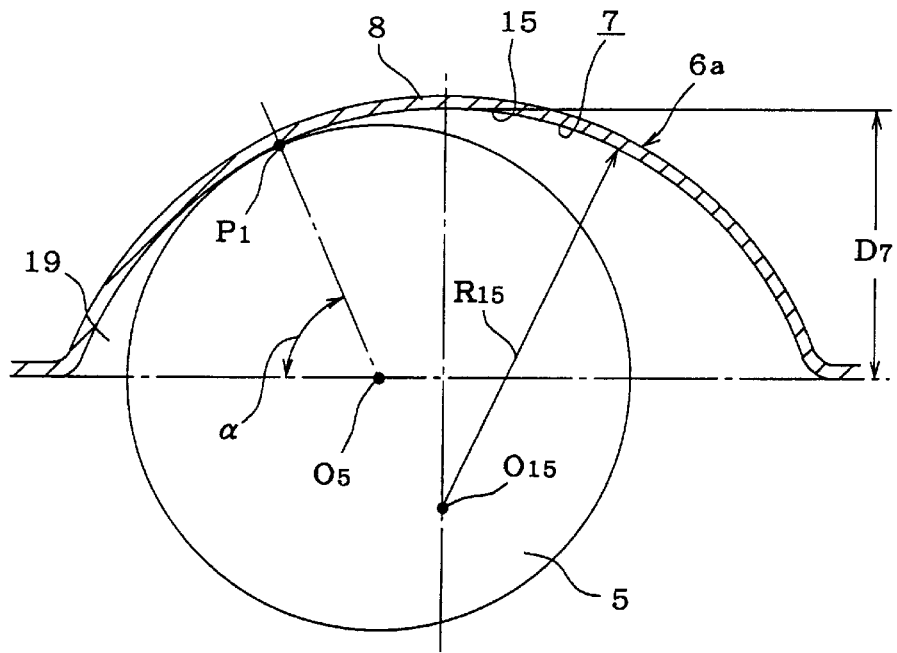
FIG. 9 is a cross sectional view taken along the line IX—IX in FIG. 8.

FIGS. 8 and 9 show a fourth example of the embodiments of the present invention, which is applied to the corrugated type cage made of metal as shown in FIG. 13.

In this example, the inner surface of the pockets 7 comprises a spherical surface portion 15 provided in the widthwise middle portion of the pockets 7 and a pair of curved surface portions 18 smoothly connected to the widthwise opposite edges of the spherical surface portion 15. The term "widthwise" means the radial direction of the cage.

The spherical surface portion 15 extends circumferentially generally along the whole length of the inner surface of the pockets 7, and recessed to have a radius of curvature $R_{15}$ slightly larger than the radius of curvature $R_5$ of the rolling contact surface of the balls 5 rotatably held in the respective pockets 7.

The curved surface portions 18 are continued from the widthwise opposite edges of the spherical surface portion 15 to the opening edge portions of the respective pockets 7 to have a radius of curvature $R_{18}$ larger than the radius of curvature of the spherical surface portion 15. That is $R_{18} > R_{15} > R_5$.

The inside edge of the respective curved surface portions 18 is smoothly continued to the widthwise edge of the spherical surface portion 15. Specifically, the direction of the tangent at the opposite edges of the spherical surface portion 15 coincides with that of the tangent at the inside edge of the respective curved surface portions 18.

The arcuate length $L_{15}$ of the spherical surface portion 15 and the arcuate length $L_{18}$ of the curved surface portions 18 are determined in design and desirably controlled for example in the following ranges:

$$L_{15} = R_{15} \times \theta_{15} = 2R_5 \times (5 \text{ to } 15\%)$$

$$L_{18} = R_{18} \times \theta_{18} = 2R_5 \times (5 \text{ to } 15\%)$$

Figure 20:
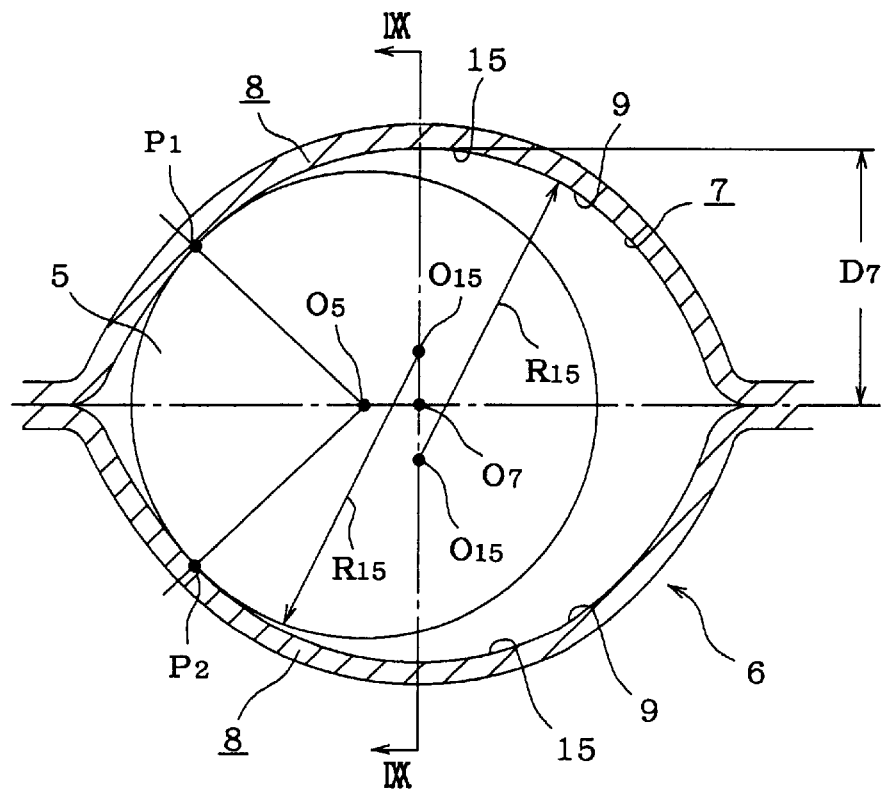
FIG. 20 is a cross sectional view taken along the line XX—XX in FIG. 19.
Figure 21:
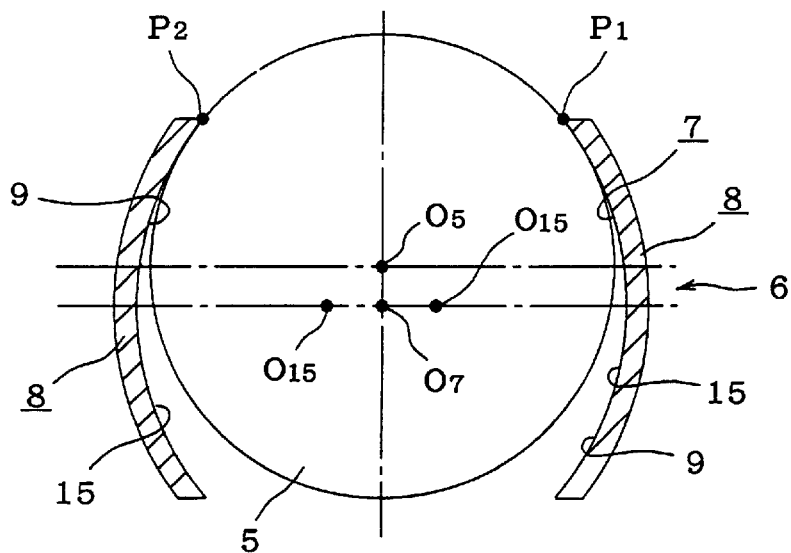
FIG. 21 is a cross sectional view taken along the line XXI—XXI in FIG. 20 where the cage is displaced toward the radially inside with reference to the ball

FIG. 9 exaggeratedly shows the cage 6a of the pockets 7 in a radial direction, which is formed in a slightly collapsed circular shape like a Rugby foot ball. Specifically, as in the conventional structure of FIG. 20, the depth $D_7$ of the pockets 7 is smaller than the radius of curvature $R_{15}$ of the spherical surface portion 15.

Particularly, in the present invention, the difference between the $D_7$ and the radius of curvature $R_{15}$, ($R_{15} - D_7$), is larger than that of the conventional structure.

Accordingly, in his example, the point $P_1$ at which the spherical surface portion 15 of the pockets 7 comes into sliding contact with the rolling contact surface of the balls 5 is relatively largely displaced from the widthwise central portion of the pockets 7 toward a widthwise end. Specifically, the angle of contact point α, that is the intersecting angle between the straight line connecting the center of the balls 5 with the $P_1$ and the line representing a circumferential direction of the cage 6, is larger than in the conventional structure in FIG. 20.

The angle of contact point α (maximum 90 degrees) is larger than the contact angle (usually 10 to 20 degrees) of the ball bearing into which the cage 6a is incorporated. Accordingly, there is a relatively large clearance 19, as shown in FIG. 9, between the rolling surface portion of the ball 5 and the inner surface of the pocket 7 holding the ball 5.

In the case of the present example, the rolling contact surface of the balls 5 comes into sliding contact with the inner peripheral surface of the pockets 7 only at the spherical surface portion 15 but not at the curved surface portions 18. Accordingly, the friction area between the inner peripheral surface of the pockets 7 and the rolling contact surface of the balls 5 decreases, and the friction vibration caused at the sliding contact portion between the cage 6a and the balls 5 decreases, whereby the vibration and noise decrease.

There are wedge shaped clearances 17a between the rolling contact surface of the balls 5 and the pair of the curved surface portions 18 on the opposite sides of the spherical surface portion 15.

In operation, the lubricant adhering to the rolling contact surface of the balls 5 is smoothly fed through the wedge shaped clearances 17a to the clearance between the spherical surface portion 15 and the rolling contact surface of the balls 5 in the ball bearing with the cage 6a installed therein.

The curved surface portions 18 extend generally along the whole length on the opposite opening portions. In addition, the wedge shaped clearances 17a extend along the whole length of the opposite opening portions. Accordingly, the lubricant is effectively fed to the clearance between the spherical surface portion 15 of the pockets 7 and the rolling contact surface of the balls 5. Consequently, the friction and friction vibration caused at the sliding contact portion between the cage 6a and the balls 5 decrease, whereby the vibration and noise decrease.

In the illustrated example, there is a relatively large clearance 19 between the rolling surface portion of the balls 5 and the inner surface of the pockets 7 holding the balls 5. The lubricant adhering to the rolling contact surface, specifically rolling surface portion, of the balls 5 is substantially not scraped and fed to the contact portions through the clearances 19 between the rolling surface portion and the inner and outer ring raceways 1 and 3 (FIG. 13). Accordingly by a sufficient amount of lubricant is fed to the contact portions to improve lubrication and durability of the ball bearing.

Figure 10:
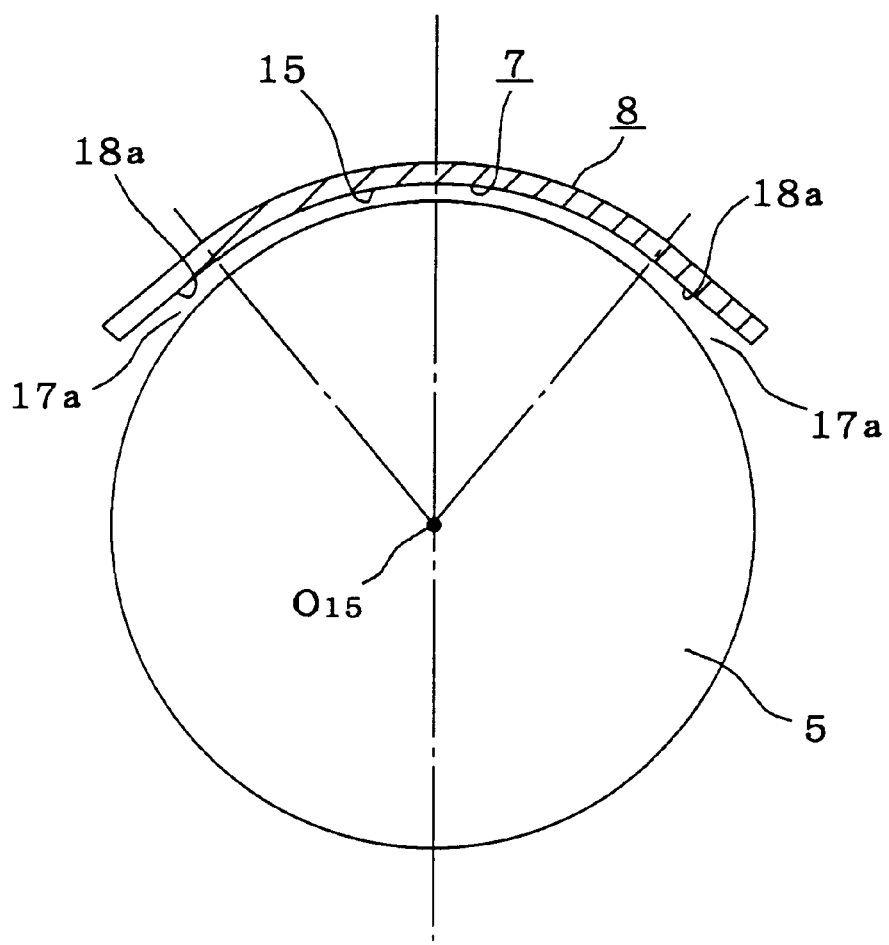
FIG. 10 is a view similar to FIG. 8 to show a fifth example of the embodiments in the present invention.
Figure 14:
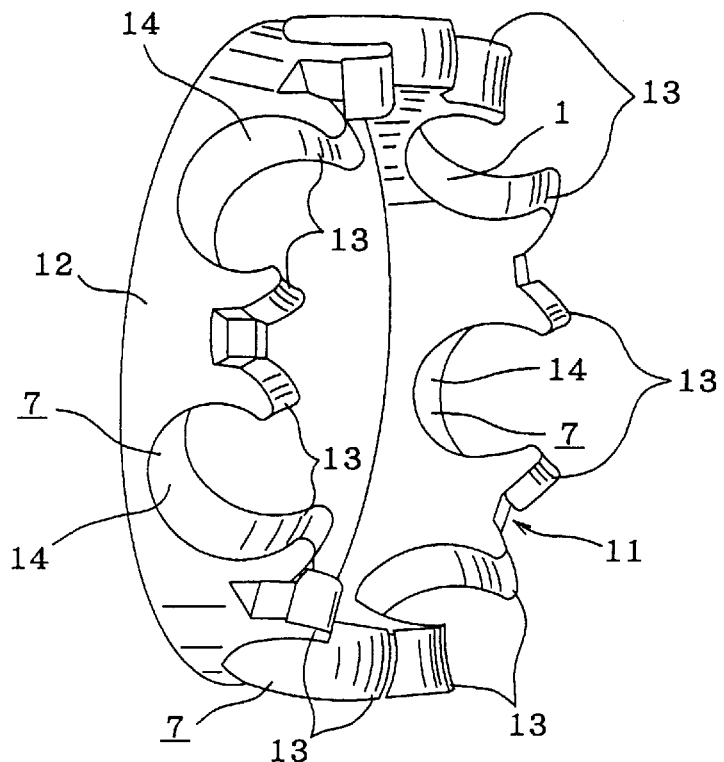
FIG. 14 is a perspective view of a cage according to another example of the present invention.
Figure 15:
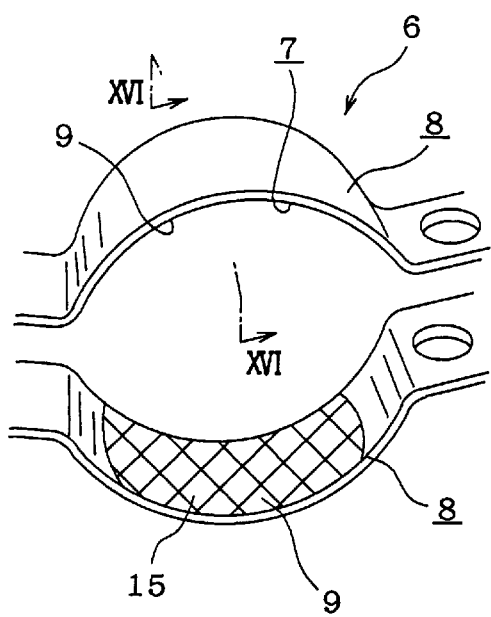
FIG. 15 is an enlarged perspective view of part of a conventional cage.
Figure 16:
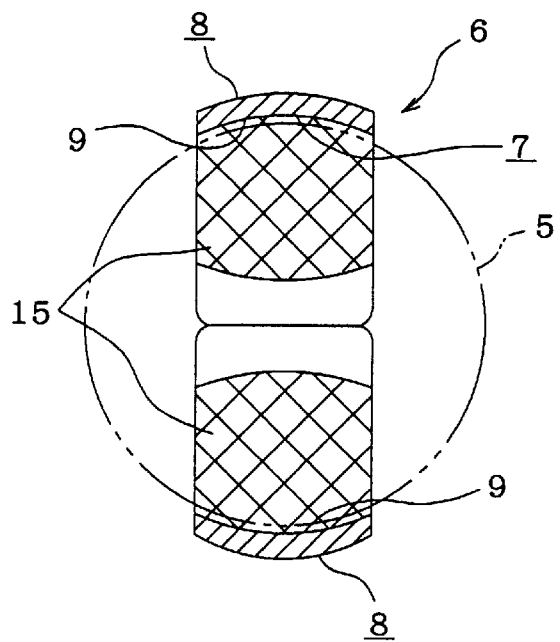
FIG. 16 is a cross sectional view taken along the line XVI—XVI in FIG. 15 where the cage is assembled.
Figure 17:
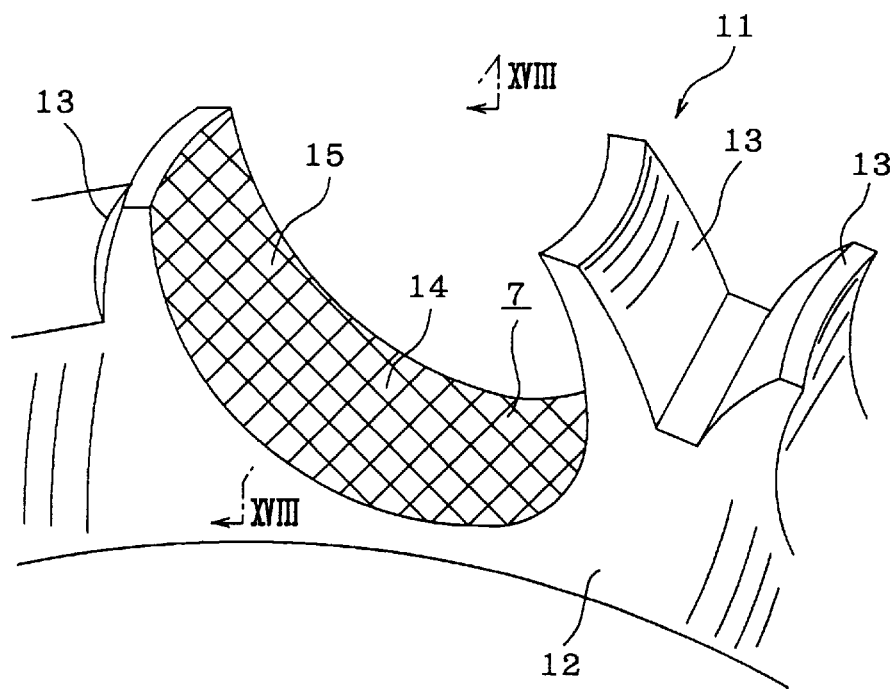
FIG. 17 is an enlarged perspective view of part of another conventional cage.
Figure 18:
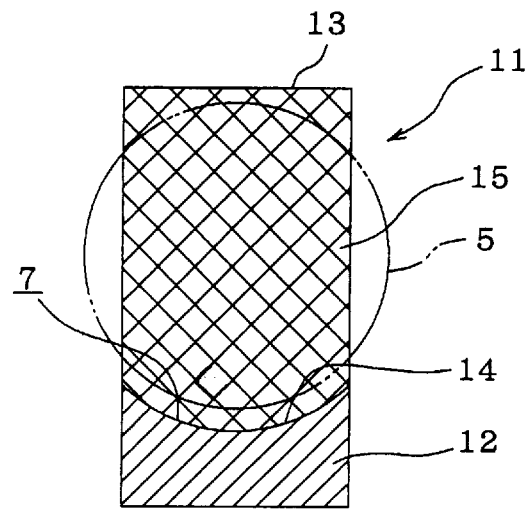
FIG. 18 is a cross sectional view taken along the line XVIII—XVIII in FIG. 17.
Figure 19:
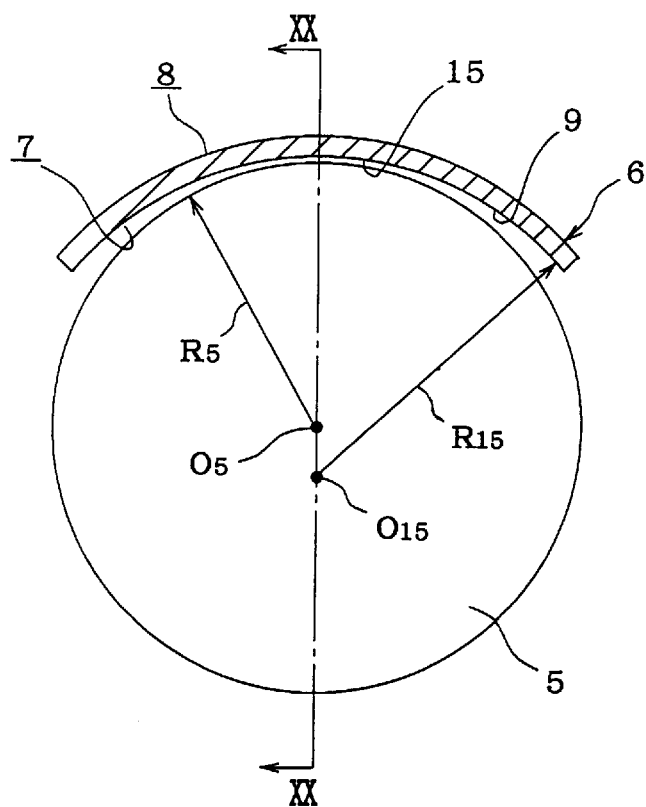
FIG. 19 is a cross sectional view of another conventional cage similar to the upper half of FIG. 16.

FIG. 10 shows a fifth example of the embodiments of the present invention, where a pair of curved surface portions 18a formed in a straight line shape in cross section are formed on the opposite sides of the spherical surface portion 15 in the inner surface of the pockets 7. Specifically, the curved surface portions 18a are formed in a frustum shape with the radius of curvature in cross section being infinite. The other constructions and functions are substantially the same to those of the fourth example. The fourth and fifth examples can be applied to the crown type cage as shown in FIG. 14.

As to the radius of curvature of the curved surface portions 18, 18a, the curved surface portions 18, 18a can be flared away from the rolling contact surface of the balls as required.

Figure 11:
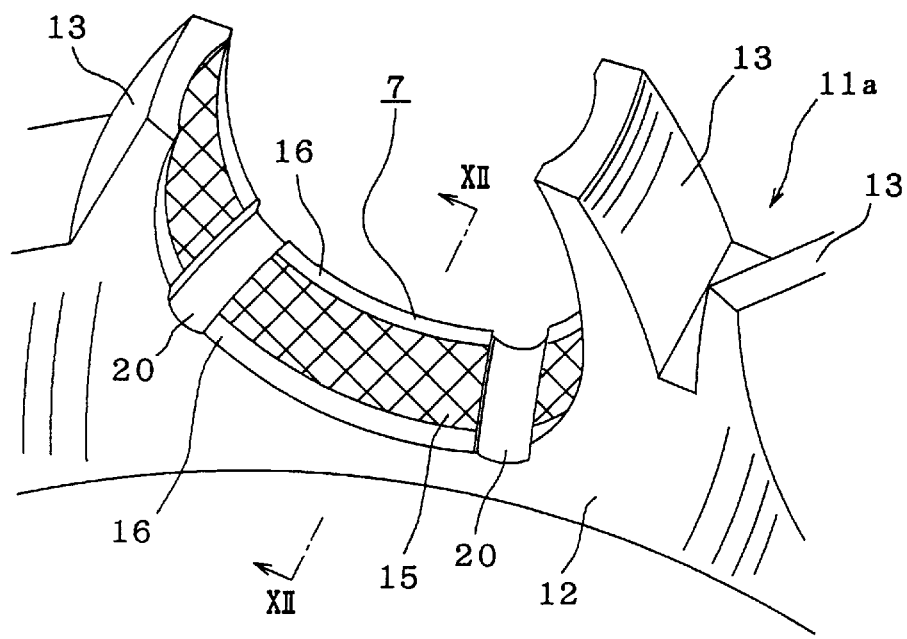
FIG. 11 is an enlarged perspective view of part of the cage according to another example of the embodiments in the present invention.

FIGS. 11 and 12 show another example of the embodiments of the present invention, where the spherical surface portion 15 is divided by two grooves 20 into three surface portions. Any number of grooves 20 can be provided so long as the smooth rotation of balls is secured.

What is claimed is:

1. A cage for a ball bearing formed generally in an annular or cylindrical shape and having a plurality of pockets circumferentially intermittently formed to hold a ball therein, respectively, the ball having a rolling contact surface with a radius of curvature and being rotatable around a spinning axis thereof, the pockets having an opening edge and an inner surface comprising a spherical surface portion and a cylindrical surface portion provided adjacent the spherical surface portion at least on one side thereof, the spherical concave surface portion formed circumferentially generally throughout the length of the inner surface of the pockets and having a radius of curvature slightly larger than the radius of curvature of the rolling contact surface of the ball, the spinning axis of the ball being directed to a portion of the spherical concave surface, and the cylindrical surface portion formed circumferentially generally throughout the length of the inner surface of the pockets and smoothly continuously between the edge of the spherical surface portion and the opening edge of the respective pockets.

2. The cage of claim 1, wherein the spherical surface portion is divided by at least one groove into a plurality of surface portions.

3. A cage for a ball bearing formed generally in an annular or cylindrical shape and having a plurality of pockets circumferentially intermittently formed to hold a ball therein, respectively, the ball having a rolling contact surface with a radius of curvature and being rotatable around a spinning axis thereof, the pockets having an opening edge and an inner surface comprising a spherical surface portion and a curved surface portion provided adjacent the spherical portion at least on one side thereof, the spherical concave surface portion formed circumferentially generally throughout the length of the inner surface of the pockets and having a radius of curvature slightly larger than the radius of curvature of the rolling contact surface of the ball, the spinning axis of the ball being directed to a portion of the spherical concave surface and the curved surface portion formed smoothly continuously between the edge of the spherical surface portion and the opening edge of the respective pockets, and having a slightly larger radius of curvature than the spherical surface portion.

4. The cage of claim 3, wherein the spherical surface portion is divided by at least one groove into a plurality of surface portions.

5. A cage for a ball bearing formed generally in an annular or cylindrical shape and having a plurality of pockets circumferentially intermittently formed to hold a ball therein, respectively, the ball having a rolling contact surface with a radius of curvature and being rotatable around a spinning axis thereof, the pockets having an opening edge and an inner surface comprising a spherical surface portion and a curved surface portion provided adjacent the spherical portion at least on one side thereof, the spherical concave surface portion formed circumferentially generally throughout the length of the inner surface of the pockets and having a radius of curvature slightly larger than the radius of curvature of the rolling contact surface of the ball, the spinning axis of the ball being directed to a portion of the spherical concave surface, and the curved surface portion formed smoothly continuously between the edge of the spherical surface portion and the opening edge of the respective pockets, and flared away from the rolling contact surface of the ball.

6. The cage of claim 5, wherein the spherical surface portion is divided by at least one groove into a plurality of surface portions.

* * * * *